United States Patent [19]

O'Sullivan

[11] Patent Number: 5,373,426
[45] Date of Patent: Dec. 13, 1994

[54] FRONT-MOUNTED VEHICLE BRAKE LIGHT

[76] Inventor: Alan L. O'Sullivan, 890 Royal Oak Ave., Victoria, British Columbia, Canada, V8X 3T2

[21] Appl. No.: 125,761

[22] Filed: Sep. 24, 1993

[51] Int. Cl.⁵ .............................................. B60Q 1/44
[52] U.S. Cl. ..................................... 362/83.3; 362/61; 340/467
[58] Field of Search ................. 362/61, 80, 80.1, 83.3; 340/467, 479

[56] References Cited

U.S. PATENT DOCUMENTS

| | | | |
|---|---|---|---|
| 3,665,392 | 5/1972 | Annas | 362/80.1 |
| 4,912,607 | 3/1990 | Kocsi et al. | 362/80.1 |
| 5,255,165 | 10/1993 | Cail | 362/80.1 |

FOREIGN PATENT DOCUMENTS 3408270 9/1985 Germany ............................ 362/80.1

Primary Examiner—Richard R. Cole
Attorney, Agent, or Firm—Hugh E. Smith

[57] ABSTRACT

A vehicle brake light signal for alerting pedestrians or other vehicle drivers positioned in front of a vehicle to a deceleration of the associated vehicle. The device includes signal assembly which may be secured to a front area of the vehicle. The signal assembly is electrically coupled to both the brake lights of the vehicle and a variable rate flasher. Upon a depression of the brake pedal of the vehicle, the signal assembly will illuminate or flash to warn others of the vehicle's deceleration. Alternate embodiments of the present invention further include a variable aperture assembly controlled by a deceleration sensor for varying the intensity of the signal assembly as a function of the vehicle's deceleration, and a lens cover positionable over the signal assembly operable to produce three distinct light zones.

6 Claims, 4 Drawing Sheets

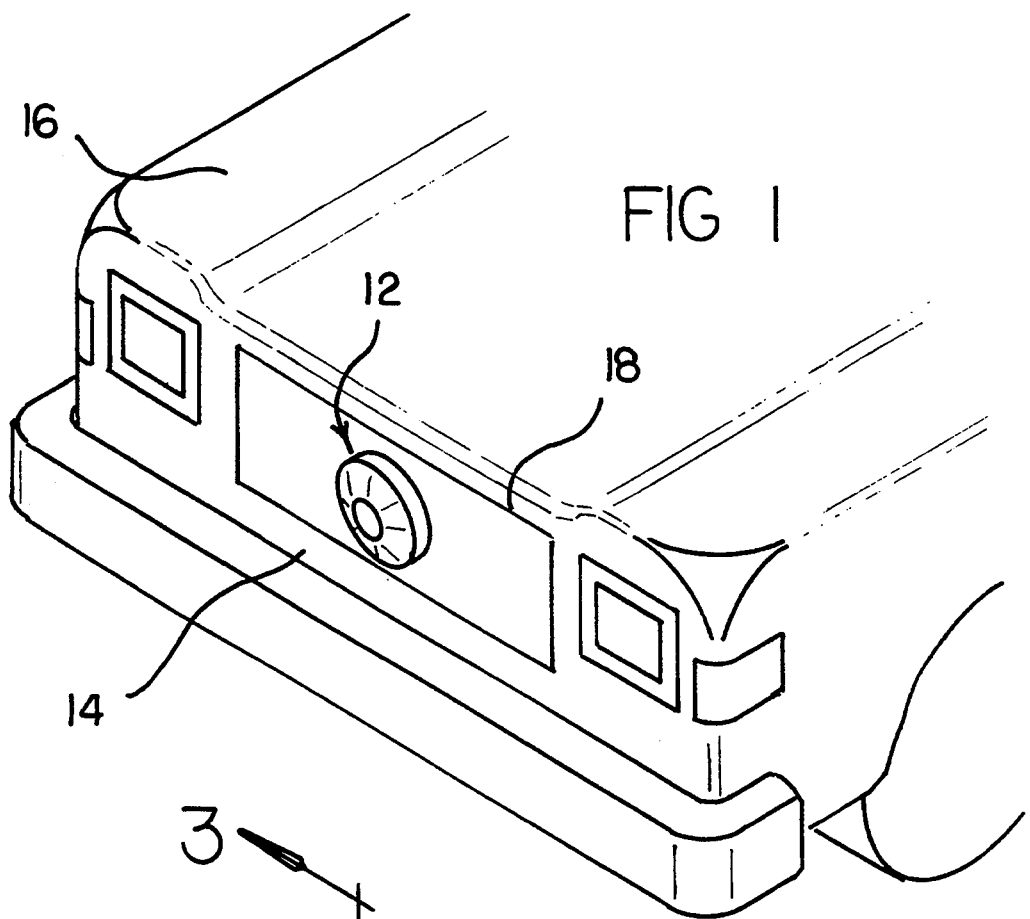
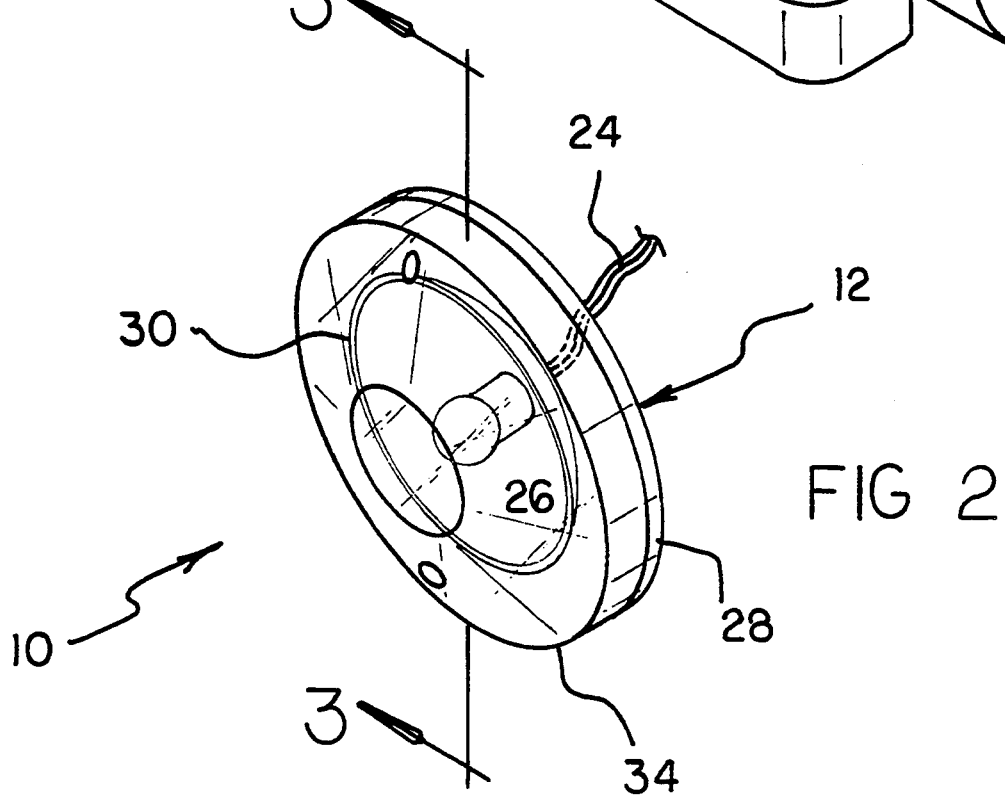

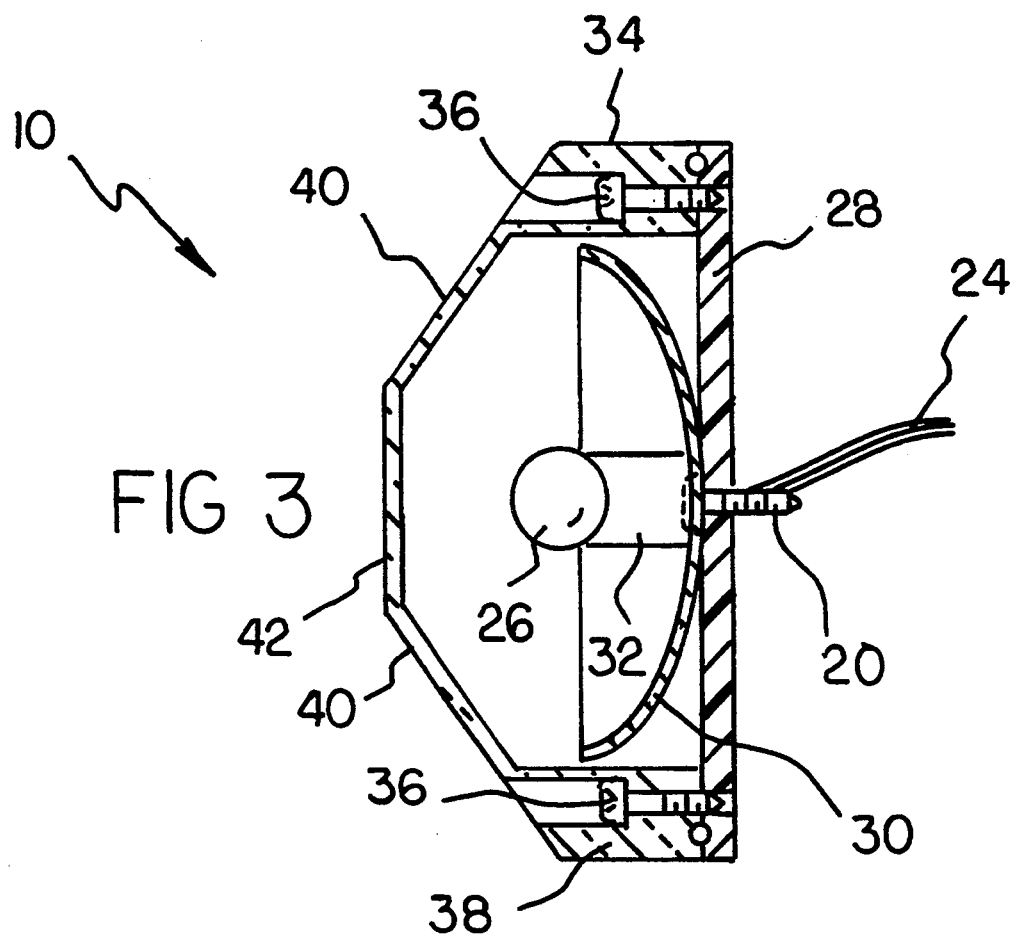
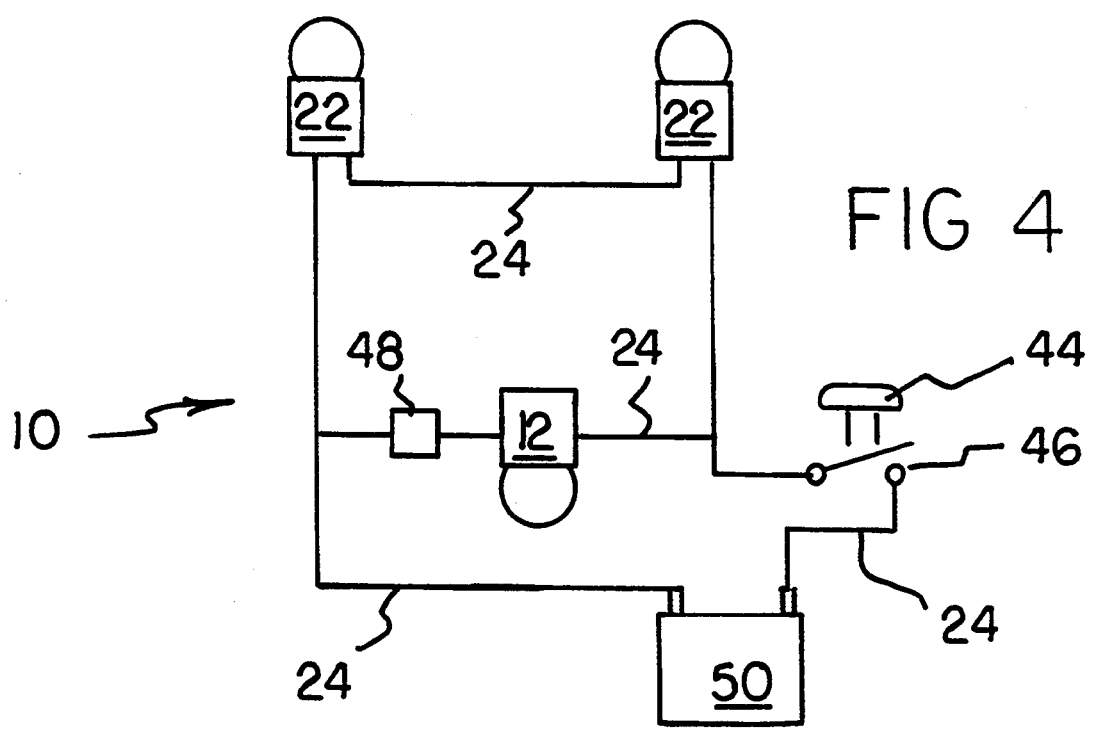

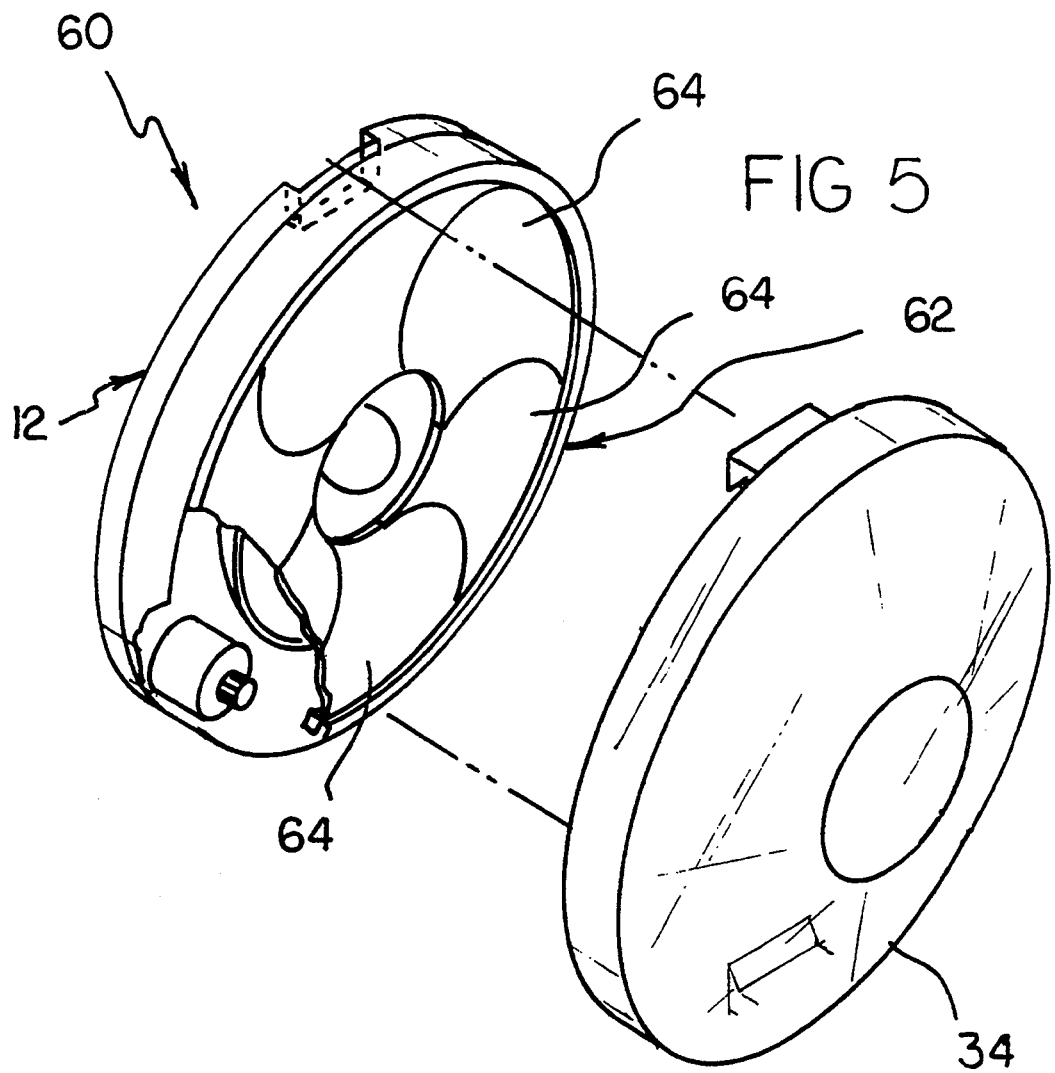
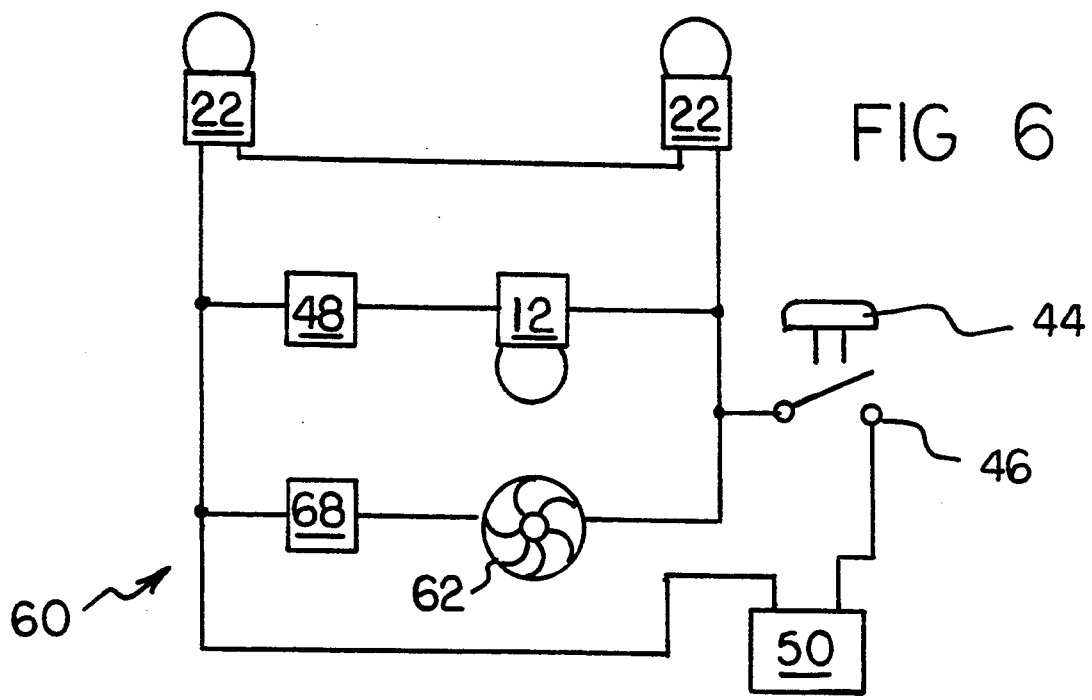

FRONT-MOUNTED VEHICLE BRAKE LIGHT

FIELD OF THE INVENTION

The present invention relates to signal lights and more particularly pertains to a front-mounted vehicle brake light which may be utilized for alerting pedestrians or other vehicle drivers positioned in front of a vehicle to a deceleration of the associated vehicle.

DESCRIPTION OF THE PRIOR ART

The use of signal lights is known in the prior art. More specifically, signal lights heretofore devised and utilized for the purpose of signalling a deceleration of a vehicle are known to consist basically of familiar, expected and obvious structural configurations, notwithstanding the myriad of designs encompassed by the crowded prior art which have been developed for the fulfillment of countless objectives and requirements.

For example, a pedestrian signal system for automobiles is illustrated in U.S. Pat. No. 5,025,245 which incorporates an alternating flasher into the main signal system of the vehicle via a relay to provide communication between a driver and a pedestrian in order to reduce vehicle-pedestrian collisions. The auxiliary system is operated by a momentary pressure on a push button and by the application of pressure to the vehicle brake pedal and will automatically shut off after a predetermined time upon a release of the brake pedal.

An automotive indicator system is described in U.S. Pat. No. 4,682,146 which utilizes a rare gas automobile indicator light system employing a single horizontally disposed indicator tube operated to provide braking, parking, emergency flasher, and turn indications. The indicator tube is operated at partial intensity for a parking function and full intensity for a braking function. A single electrode on either side thereof may be excited to provide respective left and right hand turn signal indications and the emergency flasher indication is carried out by virtue of causing periodic on and off switching of the indicator tube.

Another patent of interest is U.S. Pat. No. 4,464,649 which discloses an electronic braking alarm indicator for automobiles that will achieve flashing alarming effects in conjunction with braking signals in case of braking actions of the automobile concerned and will further achieve emergency signals for help in case of a crash or other car incident.

Other relevant documents include U.S. Pat. No. 4,956,632 and U.S. Pat. No. 5,075,826.

While these devices fulfill their respective, particular objectives and requirements, the aforementioned patents do not disclose a vehicle brake light signal for alerting pedestrians or other vehicle drivers positioned in front of a vehicle to a deceleration of the associated vehicle. Furthermore, none of the known prior art signal lights teach or suggest a vehicle brake light signal which includes a variable aperture assembly controlled by a deceleration sensor for varying the intensity of the signal emitted therefrom as a function of the vehicle's deceleration, and a lens cover operable to produce three distinct light zones.

In these respects, the front-mounted vehicle brake light according to the present invention substantially departs from the conventional concepts and designs of the prior art, and in so doing provides an apparatus primarily developed for the purpose of alerting pedestrians or other vehicle drivers positioned in front of a vehicle to a deceleration of the associated vehicle.

SUMMARY OF THE INVENTION

In view of the foregoing disadvantages inherent in the known types of signal lights now present in the prior art, the present invention provides a new front-mounted vehicle brake light construction wherein the same can be utilized for alerting pedestrians or other vehicle drivers positioned in front of a vehicle to a deceleration of the associated vehicle. As such, the general purpose of the present invention, which will be described subsequently in greater detail, is to provide a new front-mounted vehicle brake light apparatus which has many of the advantages of the signal lights mentioned heretofore and many novel features that result in a front-mounted vehicle brake light which is not anticipated, rendered obvious, suggested, or even implied by any of the prior art signal lights, either alone or in any combination thereof.

To attain this, the present invention essentially comprises a vehicle brake light signal for alerting pedestrians or other vehicle drivers positioned in front of a vehicle to a deceleration of the associated vehicle. The device includes signal assembly which may be secured to a front area of the vehicle. The signal assembly is electrically coupled to both the brake lights of the vehicle and a variable rate flasher. Upon a depression of the brake pedal of the vehicle, the signal assembly will illuminate or flash to warn others of the vehicle's deceleration. Alternate embodiments of the present invention further include a variable aperture assembly controlled by a deceleration sensor for varying the intensity of the signal assembly as a function of the vehicle's deceleration, and a lens cover positionable over the signal assembly operable to produce three distinct light zones.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new front-mounted vehicle brake light apparatus which has many of the advantages of the signal lights mentioned heretofore and many novel features that result in a front-mounted vehicle brake light which is not anticipated, rendered obvious, suggested, or even implied by any of the prior art signal lights, either alone or in any combination thereof.

It is another object of the present invention to provide a new front-mounted vehicle brake light which may be easily and efficiently manufactured and marketed.

It is a further object of the present invention to provide a new front-mounted vehicle brake light which is of a durable and reliable construction.

An even further object of the present invention is to provide a new front-mounted vehicle brake light which is susceptible of a low cost of manufacture with regard to both materials and labor, and which accordingly is then susceptible of low prices of sale to the consuming public, thereby making such front-mounted vehicle brake lights economically available to the buying public.

Still yet another object of the present invention is to provide a new front-mounted vehicle brake light which provides in the apparatuses and methods of the prior art some of the advantages thereof, while simultaneously overcoming some of the disadvantages normally associated therewith.

Still another object of the present invention is to provide a new vehicle brake light signal for alerting pedestrians or other vehicle drivers positioned in front of a vehicle to a deceleration of the associated vehicles.

Yet another object of the present invention is to provide a new front-mounted vehicle brake light which may be electrically coupled to the brake lights of a vehicle so that upon a depression of the brake pedal of the vehicle, the light will illuminate or flash to warn others of the vehicle's deceleration.

Even still another object of the present invention is to provide a new front-mounted vehicle brake light which includes a signal assembly having a variable aperture assembly controlled by a deceleration sensor for varying an intensity of the signal assembly as a function of the vehicle's deceleration.

Even still yet another object of the present invention is to provide a new front-mounted vehicle brake light which includes a lens cover positionable over the signal assembly to produce three distinct light zones.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of a first embodiment of a front-mounted vehicle brake light comprising the present invention as installed on a vehicle.

FIG. 2 is an enlarged, perspective view of a portion of the present invention.

FIG. 3 is a cross sectional view taken along line 3—3 of FIG. 2.

FIG. 4 is a diagrammatic electrical circuitry of the invention.

FIG. 5 is a perspective view of a second embodiment of a front-mounted vehicle brake light comprising the present invention.

FIG. 6 is a diagrammatic electrical circuitry of the second embodiment.

DESCRIPTION OF THE PREFERRED EMBODIMENTS

Figure 7:
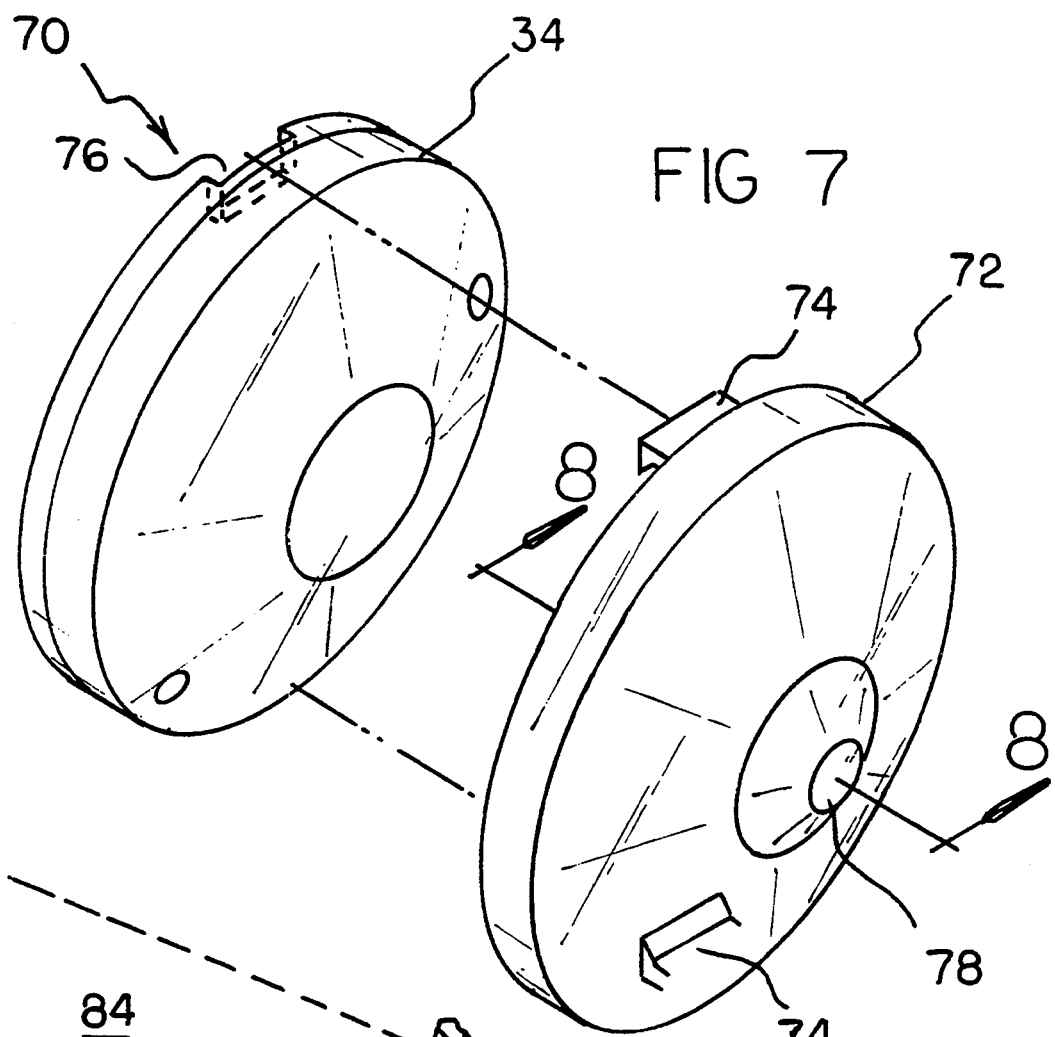
FIG. 7 is a perspective view of a third embodiment of a front-mounted vehicle brake light comprising the present invention.

With reference now to the drawings, and in particular to FIGS. 1-4 thereof, a first embodiment of a new front-mounted vehicle brake light embodying the principles and concepts of the present invention and generally designated by the reference numeral 10 will be described.

The front-mounted vehicle brake light 10 comprises a signal assembly 12 positionable upon a front exterior area 14 of a vehicle 16, as best illustrated in FIG. 1. The signal assembly 12 is preferably mounted to a center of a grill 18 of the vehicle 16 by at least one fastener 20, as shown in the cross section of the signal assembly in FIG. 3. The signal assembly 12 is electrically coupled to the conventional brake lights 22 of the vehicle by a plurality of wires 24. The wires 24 are in electrical communication with a bulb 26 comprising a portion of the signal assembly 12, as shown in FIGS. 2 and 3.

In use, the front-mounted vehicle brake light 10 will illuminate upon a depression of the brake pedal of the associated vehicle, thereby alerting pedestrians or other vehicle drivers positioned in front of the vehicle to a deceleration of the same.

More specifically, it will be noted that the front-mounted vehicle brake light 10 comprises a signal assembly 12 including a substantially circular base member 28 which supports a reflective member 30 in a center area thereof and may be secured to a grill 18 of a vehicle 16 by a fastener 20 which passes through apertures in both the base and the reflective member. The reflective member 30 is preferably comprised of a substantially reflective material having a parabolic or other light-concentrating shape. Coupled to a center area of the reflective member 30 is a socket 32 which receives and supports a bulb 26 and further provides electrical communication between the bulb and the wires 24.

A lens 34 is removably coupled to the base 28 by a plurality of lens fasteners 36 which engage both the lens and the base in a well understood manner. The lens 34 is comprised of a substantially cylindrical portion 38 having an outside diameter equal to an outside diameter of the base 28. The cylindrical portion 38 is integrally or otherwise connected to a truncated conical portion 40 which continues to define a flattened outer portion 42 in a plane substantially parallel to that defined by the base 28. The lens 34 is formed from a transparent or translucent material of any color. Although any conceivable color may be utilized, the preferred embodiment desires a lens of a green or amber color.

FIG. 4 diagrams the electrical communication between the components of the front-mounted vehicle brake light 10 provided by the wires 24 which facilitate electrical communication therebetween. As can be readily ascertained from this Figure, the signal assembly 12 is electrically connected to wires 24 of the vehicle's electrical system in such a manner so as to cause an energization of the bulb 26 upon a depression of the brake pedal 44 which closes the brake light switch 46. The signal assembly 12 may be wired in series with conventional brake lights 22, but is preferably wired in a parallel relationship therewith. The signal assembly 12 may also include a signal flasher 48 which facilitates a flashing of the signal assembly 12 upon a depression of the brake pedal 44, without providing a flashing of the conventional brake lights 22 associated therewith. As with the conventional brake lights 22, the front-mounted vehicle brake light 10 obtains electrical power from the vehicle battery 50 and, therefore, no other power source is needed.

In use, the front-mounted vehicle brake light 10 may be conveniently installed into a vehicle 16 by simply attaching the signal assembly 12 to the front area 14 of the vehicle and connecting the wires 24 in a manner shown in FIG. 4. This allows the front-mounted vehicle brake light 10 to be installed on any conventional vehicle, as well as other vehicles such as golf carts, tractors, farm equipment, or the like. The signal flasher 48 may be adjusted by a user to various flashing rates or, alternatively, the signal flasher may be set in such a manner so that the signal assembly 12 will steadily illuminate. Upon a depression of the brake pedal 44 of the vehicle 16, the signal assembly 12 will illuminate or flash accordingly to warn others of the vehicle's deceleration.

A second embodiment of the present invention as generally designated by the reference numeral 60, which comprises substantially all of the features of the foregoing embodiment 10 and which further comprises a variable aperture assembly 62 will now be described. As best shown in FIGS. 5-6, it can be shown that the variable aperture assembly 62 comprises a plurality of servo-operated aperture members 64 which are pivotally and slidably disposed upon one another in such a manner so as to provide a variable diameter signal aperture 66 operable to vary a quantity of light emitted from the signal assembly 12. The variable aperture assembly 62 is contained within the signal assembly 12 and is positioned immediately in front of the bulb 26. The aperture assembly 62 is of a conventional servo-operated design which may be operated to facilitates an automatic moving of the aperture members 64, thereby varying the diameter of the signal aperture 66.

FIG. 6 diagrams the electrical communication between the components of the second embodiment and it can be seen from this Figure that the servo-operated variable aperture assembly 62 is electrically coupled to a deceleration sensor 68. The deceleration sensor 68 is operable to control the energization of the servo-operated aperture assembly 62 to vary the diameter of the signal aperture 66 in a linearly increasing manner as a function of the deceleration of the vehicle 16. In this manner, the intensity of the light bulb 26 as viewed exteriorly of the signal assembly 12 is effectively increased in a manner proportional to the deceleration of the vehicle 16. Thus, as the deceleration of the vehicle 16 increases, the signal assembly 12 will radiate more light through the lens 34 upon a corresponding greater opening of the signal aperture 66. The servo-operated variable aperture assembly 62 coupled with the deceleration sensor allows pedestrians and other drivers to approximately ascertain the deceleration of the vehicle 16 during braking.

Figure 8:
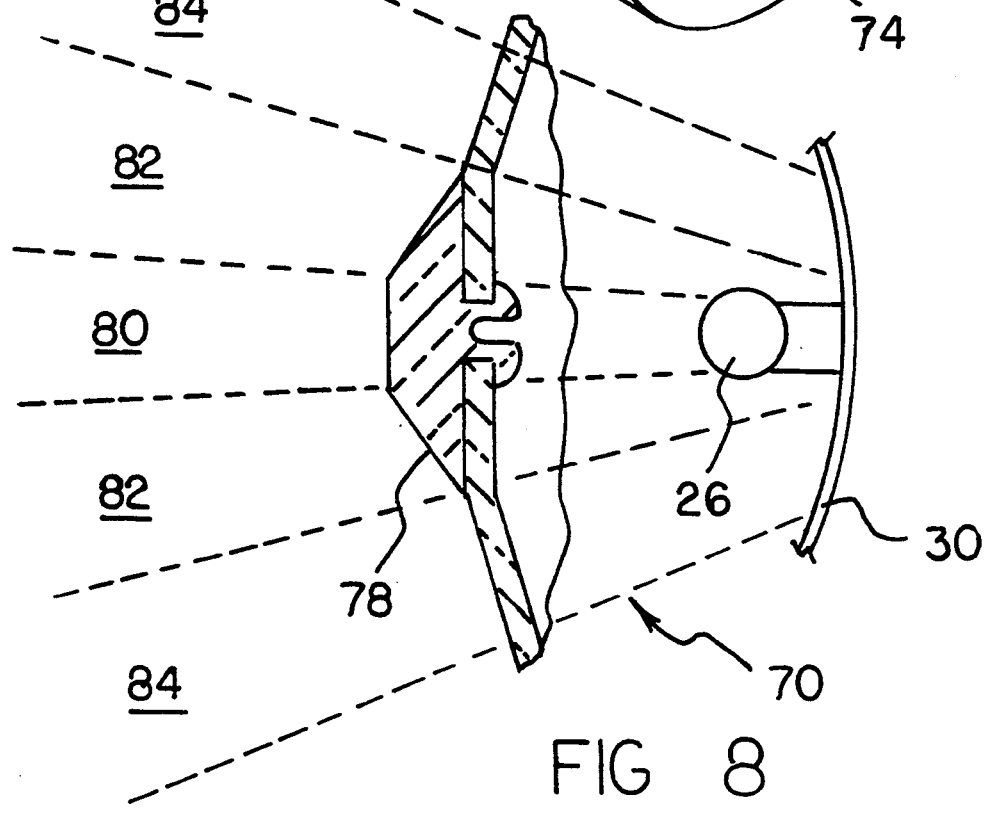
FIG. 8 is a cross sectional view taken along line 8—8 of FIG. 7 of the third embodiment.

Comprising substantially all of the features and structure of the previous embodiments 10, 60 is a third embodiment which is generally designated by the reference numeral 70 and may be viewed in FIGS. 7-8. It can be shown that the third embodiment 70 further comprises a lens cover 72 which may be removably coupled to the lens 34. The lens cover 72 includes a pair of lens cover projections 74 which are operable to be engaged to grooves 76 present in the lens 34. The lens cover 72 is also provided with a diffuser lens 78 having an unlabeled bifurcated projection which engages an unlabeled aperture in a center of the lens cover. The diffuser lens 78 is preferably comprised of a substantially translucent material having a color different than a color of the lens cover 72. However, the diffuser lens 78 may also be comprised of any substantially transparent or translucent material.

As best shown in FIG. 8, light generated by the bulb 26 is reflected from the reflective member 30 and through both the lens cover 72 and the diffuser lens 78. In the preferred embodiment, the diffuser lens 78 is comprised of an amber colored material which generates a center zone 80 having an amber color defined by the light passing only through the diffuser lens. A concentric medial zone 82 is created by light passing through both the diffuser lens 78 and the lens cover 72. The preferred embodiment includes a lens cover 72 formed from a substantially red, translucent material, thereby giving the light defining the medial zone 82 a red-amber color. Finally, an outboard zone 84 positioned concentrically, exteriorly of both the medial zone 82 and the center zone 80, is created by light passing through only the lens cover 72. In accordance with the preferred color of the lens cover 72, the outboard zone 84 is of a substantially red color.

The aforementioned structure allows the front-mounted vehicle brake light 10, utilized without the variable aperture assembly 62, to project red light towards pedestrians standing on the side of the road and amber light towards vehicles positioned in front of the associated vehicle. Should the variable aperture assembly 62 be included with the third embodiment 70, the signal assembly 12 will generate light which both increases in intensity and changes colors as a function of the deceleration of the vehicle 16.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A new vehicle front brake light for mounting to a front area of a vehicle having a brake light electrical system, said vehicle front brake light comprising:
   a base mountable to said front area of said vehicle;
   a reflective member having an arcuate shape mounted to a center area of said base;
   a socket secured to a center of said reflective member;
   wire means electrically connected to said socket and connectable to said brake light electrical system for providing electrical communication between said light bulb and said brake light electrical system;
   a signal flasher means having a variable flashing rate, said signal flashier means being in electrical communication with said light bulb for adjustably flashing said light bulbs;
   and,
   a lens means removably coupled to said base for both enclosing said light bulb and modifying light emitted therefrom.

2. The new vehicle front brake light of claim 1, and further comprising a servo-operated variable aperture means positioned between said light bulb and said lens means for mechanically adjusting an intensity of said light bulb viewed exteriorly of said lens means.

3. The new vehicle front brake light of claim 2, and further comprising a deceleration sensor means in electrical communication with said servo-operated variable aperture means for operating said variable aperture means as a function of a deceleration of said vehicle.

4. The new vehicle front brake light of claim 3, and further comprising a lens cover releasably coupled to said lens means for modifying light passing therethrough.

5. The new vehicle front brake light of claim 4, and further comprising a diffuser lens coupled to a center area of said lens cover, said diffuser lens being of a color different than a color of said lens cover.

6. The new vehicle front brake light of claim 5, wherein a diameter of said diffuser lens is smaller than a diameter of said lens cover such that light passing through said cover defines three light zones of differing colors.

* * * * *